US012752488B2

(12) United States Patent
Kliphardt et al.

(10) Patent No.: US 12,752,488 B2
(45) Date of Patent: Oct. 6, 2026

(54) ADDITIVE MANUFACTURING SYSTEM

(71) Applicant: Continuous Composites Inc., Coeur d'Alene, ID (US)

(72) Inventors: Wesley John Kliphardt, Spokane Valley, WA (US); Brennon Scott Wilsey, Spokane Valley, WA (US); Christopher Lee Jones, Post Falls, ID (US)

(73) Assignee: Continuous Composites Inc., Coeur d'Alene, ID (US)

( * ) Notice: Subject to any disclaimer, the term of this patent is extended or adjusted under 35 U.S.C. 154(b) by 230 days.

(21) Appl. No.: 18/319,013

(22) Filed: May 17, 2023

(65) Prior Publication Data

US 2024/0042690 A1 Feb. 8, 2024

Related U.S. Application Data

(60) Provisional application No. 63/365,254, filed on May 24, 2022.

(51) Int. Cl.
*B29C 64/25* (2017.01)
*B29C 64/209* (2017.01)
*B29C 64/245* (2017.01)
*B33Y 30/00* (2015.01)

(52) U.S. Cl.
CPC ............ *B29C 64/25* (2017.08); *B29C 64/209* (2017.08); *B29C 64/245* (2017.08); *B33Y 30/00* (2014.12)

(58) Field of Classification Search
CPC .... B29C 64/245; B29C 64/25; B29C 45/1774
See application file for complete search history.

(56) References Cited

U.S. PATENT DOCUMENTS 4,976,598 A * 12/1990 Hehl .................. B29C 45/1774 425/161
2008/0017620 A1* 1/2008 Sukhman ............. B23K 26/702 219/121.86
2014/0043630 A1* 2/2014 Buser ...................... H04N 13/20 358/1.15
2017/0297264 A1* 10/2017 Linnell ................. B29C 64/379
2017/0369827 A1* 12/2017 Langenfeld ........... A61L 27/222
2018/0178463 A1* 6/2018 Manian ................. B29C 64/209
2018/0194076 A1* 7/2018 Bell ....................... B29C 64/393
2019/0177676 A1* 6/2019 Chow ................... B29C 64/245
2019/0301970 A1* 10/2019 Ream .................... G01J 1/0437

(Continued)

FOREIGN PATENT DOCUMENTS

EP 2329935 A1 * 6/2011 ........... B29C 64/209
KR 20170057845 A * 5/2017

OTHER PUBLICATIONS

Machine Translation of KR20170057845A (Year: 2017).*

(Continued)

*Primary Examiner* — Ariella Machness
(74) *Attorney, Agent, or Firm* — Ryan Stockett

(57) ABSTRACT

A system is disclosed for additively manufacturing a structure. The system may have a pedestal, a motion platform mounted to the pedestal, and a print head coupled to the motion platform. The system may also include an enclosure at least partially surrounding the motion platform and the print head, and a print surface configured to selectively dock with the pedestal.

13 Claims, 8 Drawing Sheets

(56) References Cited

U.S. PATENT DOCUMENTS

| | | | | |
|---|---|---|---|---|
| 2020/0238448 | A1* | 7/2020 | Hampshire | B22F 7/062 |
| 2020/0238622 | A1* | 7/2020 | Seo | F04B 39/06 |
| 2021/0387402 | A1* | 12/2021 | Swanson | B29C 48/92 |
| 2023/0264424 | A1* | 8/2023 | Matsuura | B29C 64/25 425/143 |

OTHER PUBLICATIONS

Creality (https://www.amazon.com/Enclosure-Fireproof-Dustproof-Temperature-Protective/dp/B08FD8M2BP/ref=asc_df_B08FD8M2BP?mcid=bdbd1d1e9a9e34fb9df585efb8062962&hvocijid=4777371115747226621-B08FD8M2BP-&hvexpln=73&tag=hyprod-20&linkCode=df0&hvadid=721245378154&hvpos=&hvnetw=g&hvra (Year: 2020).*

Creality Ender-3—https://3dprinting.com/products/3d-printer/creality-ender-3-2022/ (Year: 2020).*

Douglass ("Addressing Production Challenges with Go-To Market Limitations with Established Additive Manufacturing Service Providers", a White Paper from Lincoln Electric published Apr. 17, 2020 (Year: 2020).*

Douglass New Lincoln White Paper Shows How Advanced in Wire-based Additive Manufacturing Solve Common Industrial Manufacturing Challenges (https://www.lincolnelectric.com/en/newsroom/press-releases/2020/07/new-lincoln-electric-white-paper-shows-how-advances-in-wire-based-additive-manufacturing-solv) (Year: 2020).*

Machine translation of EP2329935A1 (Year: 2011).*

Dobot Magician Robotic Arm ("Dobot Magician Robotic Arm—Advanced Educational Plan", https://www.robotlab.com/store/dobot-robotic-arm?srsltid=AfmBOorwsaYihNQ1qQN1Z6K8OBqgWu9hNuQDL_suhN80lo3MLx_eYVz6; YouTube video in link uploaded Sep. 6, 2018) (Year: 2018).*

Of Snapmaker ("Enclosure for Snapmaker 2.0" https://shop.snapmaker.com/products/enclosure-for-snapmaker-2-0-3d-printer-enclosure?srsltid=AfmBOoqU4nw7NT4ZKvo3hVB5DrSTHwVAjUPvPj0cy2A0O--GcBTQq9-J, earliest review on website published on Sep. 10, 2020) (Year: 2020).*

Electroimpact, Electroimpact Continuous Fiber 3D Printing, URL: https://www.electroimpact.com/3d/overview.aspx, May 16, 2023.

* cited by examiner

ADDITIVE MANUFACTURING SYSTEM

RELATED APPLICATION

This application is based on and claims the benefit of priority from U.S. Provisional Application No. 63/365,254 that was filed on May 24, 2022, the contents of which are expressly incorporated herein by reference.

TECHNICAL FIELD

The present disclosure relates generally to a manufacturing system and, more particularly, to a system for additively manufacturing an object.

BACKGROUND

Traditional additive manufacturing is a process of creating three-dimensional parts by depositing overlapping layers of material under the guided control of a computer. A common form of additive manufacturing is known as fused deposition modeling (FDM). Using FDM, a thermoplastic is passed through and liquified within a heated print head. The print head is moved in a predefined trajectory (a.k.a., a tool path) as the material discharges from the print head, such that the material is laid down in a particular pattern and shape of overlapping 2-dimensional layers. The material, after exiting the print head, cools and hardens into a final form. A strength of the final form is primarily due to properties of the particular thermoplastic supplied to the print head and a 3-dimensional shape formed by the stack of 2-dimensional layers.

A recently developed improvement over traditional FDM manufacturing is known as Continuous Fiber 3-D printing (CF3D®). CF3D involves the use of continuous fibers embedded within material discharging from the print head. In particular, a matrix is supplied to the print head and discharged (e.g., extruded and/or pultruded) along with one or more continuous fibers also passing through the same head at the same time. The matrix can be a traditional thermoplastic, a powdered metal, a liquid matrix (e.g., a UV curable and/or two-part resin), or a combination of any of these and other known matrixes. Upon exiting the print head, a cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space. And when fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

Certain challenges can arise when manufacturing objects using multiple distinct processing steps. For example, an object that requires one or more additive processes (e.g., FDM, CF3D, etc.), heat treatment processes, machining process, etc., may need to be moved between different processing stations during each step of manufacture. For the processes to be completed reliably, the object should be accurately positioned and/or repositioned at each station. Otherwise, the object could be exposed to unspecified or undesired processing parameters. Using existing systems, it can be difficult to locate a partially fabricated object accurately and repeatedly. This can cause poor object quality and/or waste when objects need to be discarded or reworked due to improper completion of a processing step.

Further, additive manufacturing systems are increasing in size (e.g., larger build volumes, heavier gantries and robotic arms, bulky print heads, etc. that are used to manufacture ever larger parts) and speed. With the increasing scale, operational zones clear of obstructions becomes a greater concern.

The disclosed system is directed at addressing one or more of these issues and/or other problems of the prior art.

SUMMARY

In one aspect, this disclosure is directed towards a system for additively manufacturing a structure. The system may include a pedestal, a motion platform mounted to the pedestal, and a print head coupled to the motion platform. The system may also include an enclosure at least partially surrounding the motion platform and the print head, and a print surface configured to selectively dock with the pedestal.

DETAILED DESCRIPTION

The term "about" as used herein serves to reasonably encompass or describe minor variations in numerical values measured by instrumental analysis or as a result of sample handling. Such minor variations may be considered to be "within engineering tolerances" and in the order of plus or minus 0% to 10%, plus or minus 0% to 5%, or plus or minus 0% to 1% of the numerical values.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Figure 1:
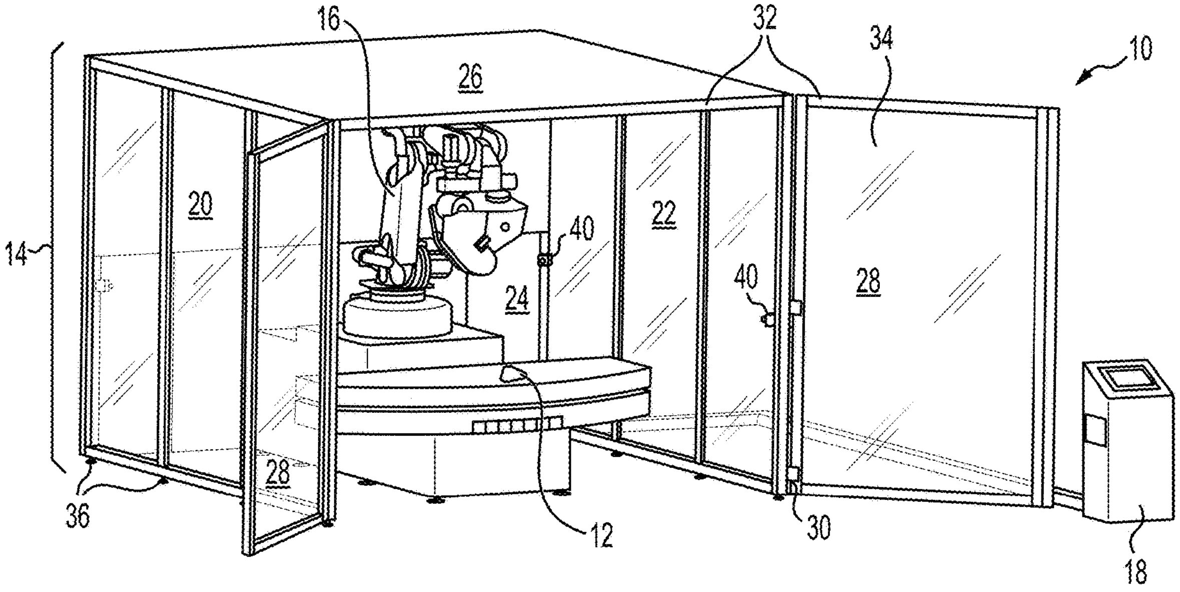
FIGS. 1 and 2 are perspective view illustrations of an exemplary disclosed manufacturing system.
Figure 2:
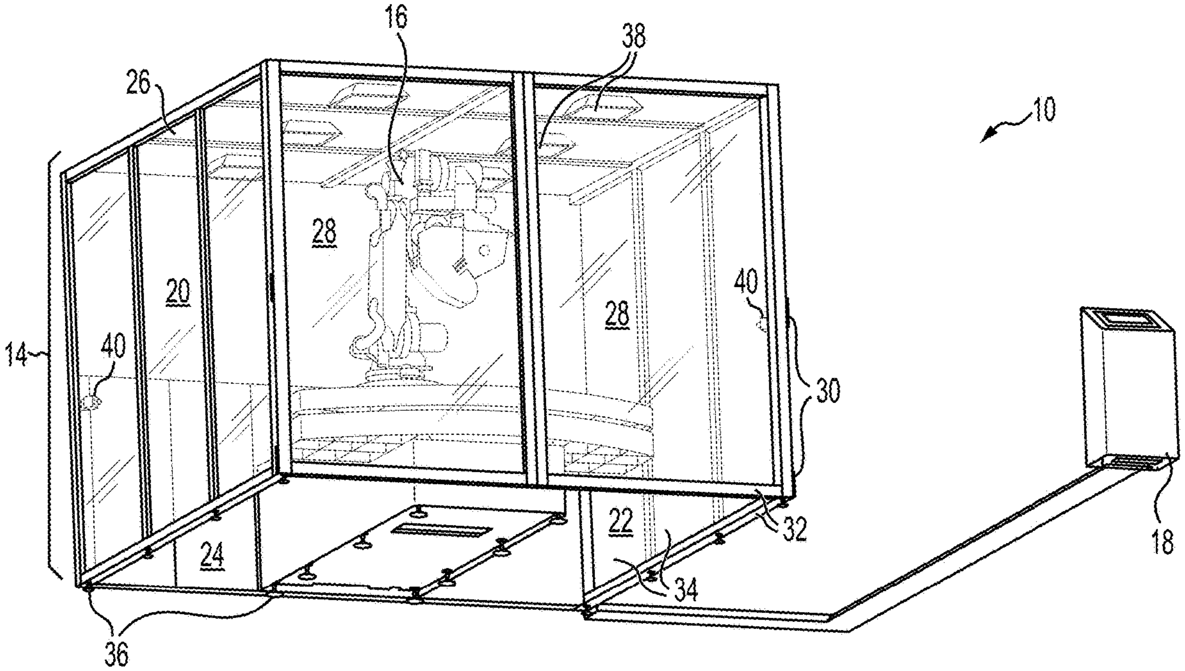

FIGS. 1 and 2 illustrate an exemplary manufacturing system ("system") 10, which may be used to additively manufacture a structure 12. System 10 may include, among other things, an enclosure 14, an additive manufacturing machine ("machine") 16, and a human-machine interface ("HMI") 18. Enclosure 14 may substantially surround and enclose machine 16. HMI 18 may be accessible at least from outside of enclosure 14 and be used to operate machine 16.

As illustrated in FIGS. 1-5, enclosure 14 may generally be cuboid. For example, enclosure 14 may include a left-side wall 20, a right-side wall 22, a rear wall 24 connected between left- and right-side walls 20, 22, and a ceiling 26 connected between all three of the walls. A front of enclosure 14 may be formed by one or more doors (e.g., two doors) 28 that can be selectively opened and closed (e.g., via pivoting about one or more hinges 30 and/or sliding). In one embodiment, doors 28 are manually opened/closed. In other embodiments, however, doors 28 may additionally or alternatively be automatically opened (e.g., via HMI 18 and one or more actuators—not shown). Similarly, doors 28 may be manually and/or automatically locked, if desired.

In one example, an interlock device (not shown) may be employed that automatically locks doors 28 anytime machine 16 is activated. In this example, the interlock device may embody a physical lock or bolt that engages doors 28 and/or the floor beneath enclosure 14, ceiling 26, one or both of walls 20, 22, etc. In another example, the interlock device may not inhibit opening of doors 28, but simply deactivate system 10 when doors 28 are opened. For example, a sensor (not shown) may generate a signal when doors 28 are opened, and the signal may be used (e.g., by a controller of machine 16 or another controller) to freeze motion of machine 16, cut power to machine 16, or otherwise inhibit operation of machine 16. In this latter example, the interlock device may be overruled by use of an internal pendant, if desired.

When enclosure 14 is placed onto an existing surface, enclosure 14 and the existing surface may together form an enclosed space in which machine 16 can be situated. It is contemplated, however, that enclosure 14 could include an additional floor component, if desired. Enclosure 14 may or may not be hermetically sealed (e.g., via foam stripping and/or other sealant around the front opening) when doors 28 are closed.

An interior volume of enclosure 14 may be about 50-60 $m^3$ (e.g., about 56 $m^3$). For example, a height from the existing surface or floor to ceiling 26 may be about 3-4 m (e.g., about 3.5 m). A distance between side walls 20, 22 may be about 3.5-4.5 m (e.g., about 4 m). A distance between rear wall 24 and doors 28 (e.g., when closed) may be about 3.5-4.5 m (e.g., about 4 m).

One or more of walls 20-24, ceiling 26, and/or doors 28 may be at least partially transparent. For example, side walls 20, 22 and doors 28 are shown in FIGS. 1-5 as being partially transparent, allowing operation of machine 16 to be monitored from outside of enclosure 14. Walls 20-24 and ceiling 26 may fabricated from a skeletal structure 32 and any number of panels (e.g., glass, plexiglass, plastic or metal panels) 34 mounted to structure 12 over corresponding open spaces. In some applications, a film may be placed on the transparent portion(s) (e.g., glass or plexiglass panels) of enclosure 14 (or panels 34 may otherwise be internally tinted) to at least partially block radiation (e.g., UV light) from entering enclosure 14. Any number of leveling feet 36 may protrude from the skeletal structure to engage the existing surface below.

As shown in FIG. 2, enclosure 14 may be internally illuminated. For example, one or more lights 38 may be mounted to an interior (e.g., to ceiling 26) of enclosure 14. Lights 38 may be automatically activated upon opening of door(s) 28 (e.g., via generation of a signal from the sensor associated with door 28) and/or via HMI 18. Lights 38, in one embodiment, may be selected and/or filtered to avoid discharge of radiation within the UV spectrum.

One or more devices ("e-stops") 40 may be situated within enclosure 14 for manual use by an operator. In the disclosed embodiment, multiple e-stops 40 are included (e.g., one located within each vertical corner of enclosure 14). An additional e-stop 40 may be associated with HMI 18. Upon activation of any one of e-stops 40, all motion of machine 16 may be stopped. This may include an electronic freeze of the motion and/or a cut in power to actuators of machine 16, among other things.

Figure 5:
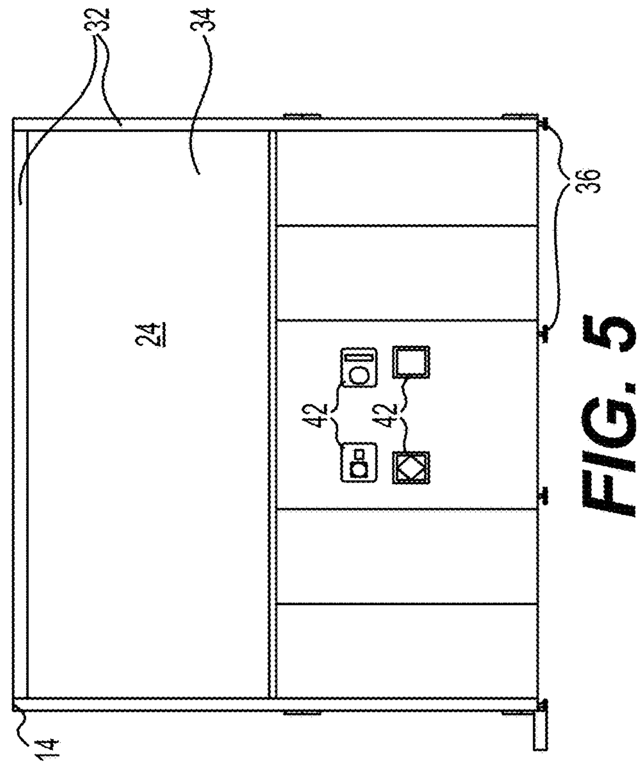
FIGS. 3, 4, and 5 are various plan view illustrations of the manufacturing system of FIGS. 1 and 2.

As shown in FIG. 5, rear wall 24 may host any number of different ports 42. As will be explained in more detail below, ports 42 may be used for ventilation, power supply, signal supply, material (e.g., pressurized gas, such as air) supply, and/or other needs.

Rear wall 24 may additionally provide access to any number of service stations. These service stations may accommodate interchangeable components of machine 16. The components may be loaded into the service stations from outside of enclosure 14 and accessed by machine 16 from inside of enclosure 14.

Figure 6:
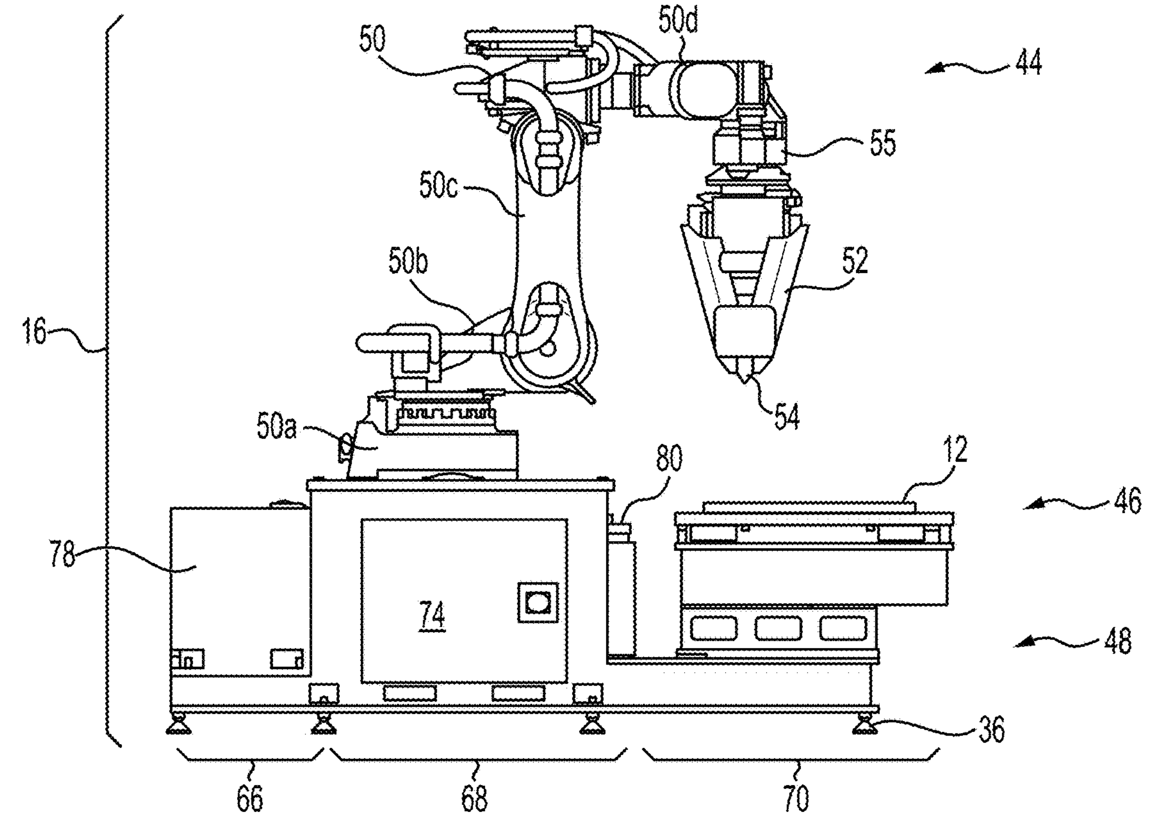
FIGS. 6 and 7 are perspective view illustrations of an exemplary disclosed manufacturing machine that forms a portion of the system of FIGS. 1 and 2.
Figure 7:
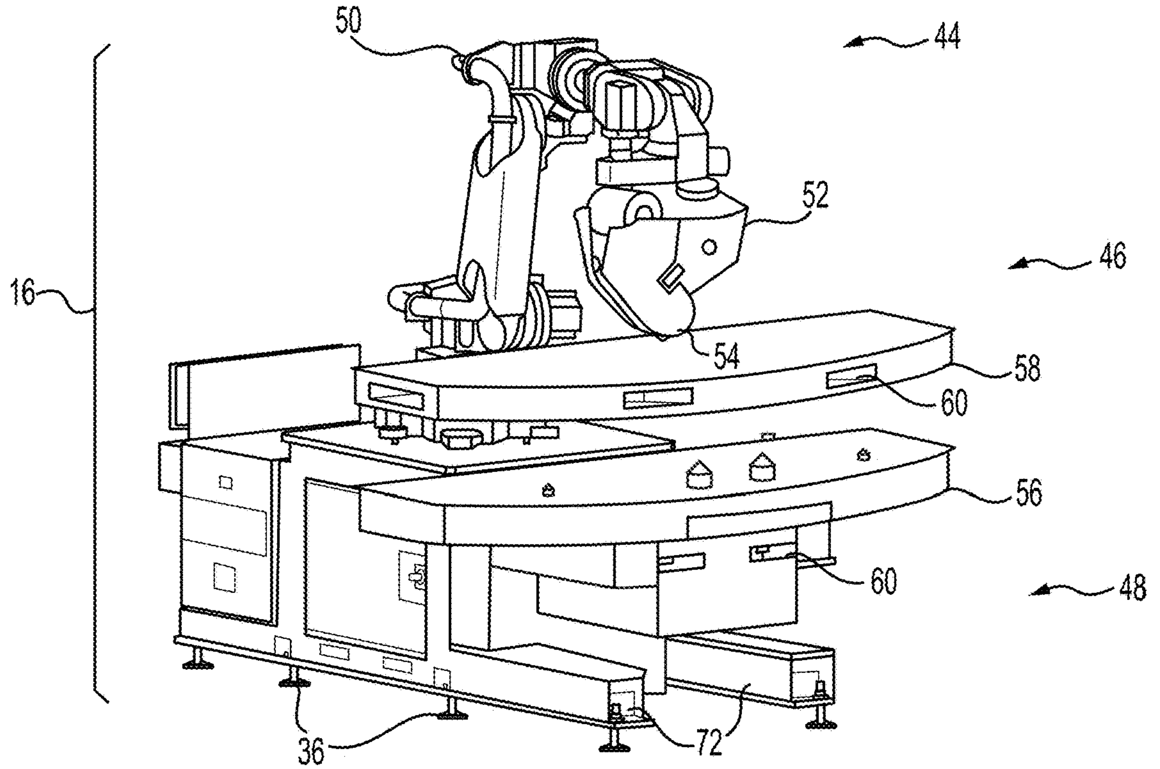

As shown in FIGS. 6 and 7, machine 16 may include, among other things, a printer 44, a table 46, and a pedestal 48. Printer 44 may be configured to discharge a material into a print volume 53 (shown in FIG. 8) adjacent (e.g., above) table 46 to fabricate structure 12. Printer 44 and table 46 may both be supported by pedestal 48.

Printer 44 may include a motion platform ("platform") 50 and one or more deposition heads ("head(s)") 52 couplable to and moveable by platform 50. In the disclosed embodiments, platform 50 is a robotic arm capable of moving head(s) 52 in multiple directions during fabrication of structure 12. Platform 50 may alternatively embody a gantry (e.g., an overhead bridge or single-post gantry) or a hybrid gantry/arm also capable of moving head(s) 52 in multiple directions during fabrication of structure 12. Although platform 50 is shown as being capable of movements along and/or about 6-axes, it is contemplated that platform 50 may be capable of moving head(s) 52 in a different manner (e.g., along or about a greater or lesser number of axes). In some embodiments, a drive 55 may mechanically couple head(s) 52 to platform 50 and include components that cooperate to move portions of and/or supply power or materials to head 52.

Platform 50, as a robotic arm, may include a base **50*a* fixedly connected to pedestal 48, and any number of links cascadingly connected to base 50*a*. For example, a first link 50*b* may be connected to base 50*a* at a waist joint; a second link 50*c* may be connected to first link 50*b* at a shoulder joint; a third link 50*d* may be connected to second link 50*c* at an elbow joint; and head 52 may be connected to third link 50*d* at drive 55. In some embodiments, an additional joint (e.g., a wrist joint) may be located between head 52 and drive 55**, if desired.

Machine 16 may have one or more predefined build volumes inside of enclosure 14. That is, based on physical size constraints of enclosure 14 and known kinematics of machine 16, machine 16 may be controllably limited to fabricate structure 12 only within a specified size and shape envelope known as the build volume.

Figure 8:
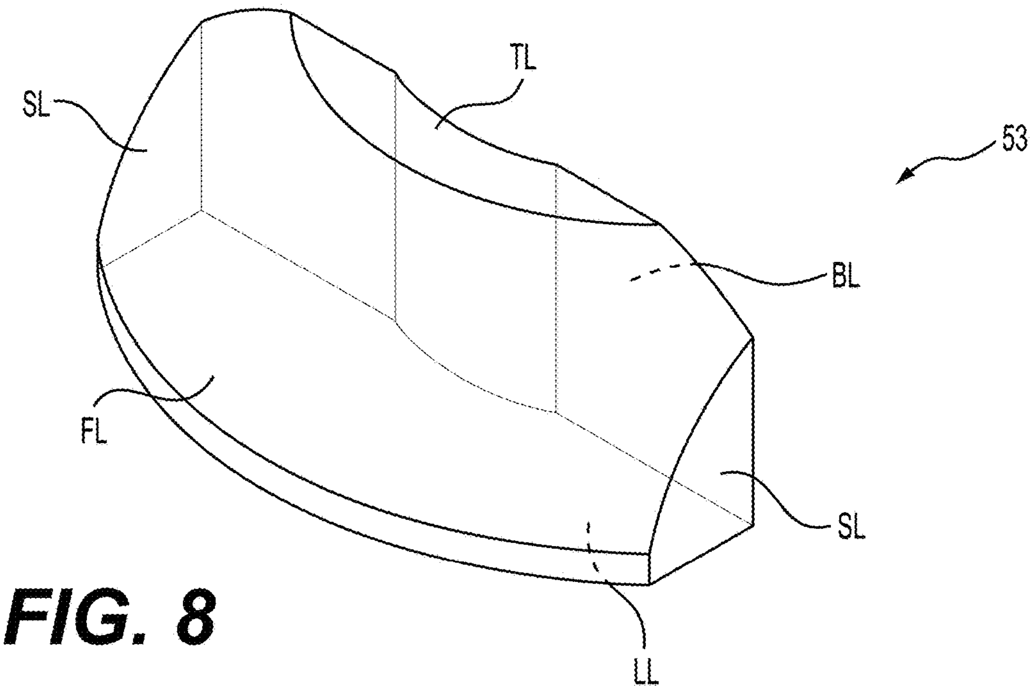
FIG. 8 is a diagrammatic illustration of an exemplary build volume that may be used by the manufacturing machine of FIGS. 6 and 7.

A first example build volume ("volume") 53 is illustrated in FIG. 8 as being at least partially toroidal (e.g., cardioid-toroidal). A front limit FL of volume 53 facing doors 28 may be generally toroidal, with base **50*a* forming a center of the toroidal shape. A lower limit LL of volume 53 may be generally planar and correspond with an upper surface of table 46. Opposing side limits SL of volume 53 may likewise be generally planar (e.g., oriented normal to the lower limit) and correspond with lateral ends of table 46. A horizontal distance between the side limits may be about 250-300 mm (e.g., about 275 mm). A back limit BL of volume 53 may be planar (e.g., generally parallel with rear wall 24 and normal to both the lower and side limits) to match table 46, toroidal (e.g., generally concentric with the front limit) to follow the natural pivoting motion of machine 16 about the waist joint, or a combination of planar and toroidal limits (e.g., a center toroidal shape with planar lateral end limits—shown in FIG. 8). A horizontal distance between the front limit and the back limit, at the lower limit, may be about 100-110 mm (e.g., about 105 mm). A top limit TL of volume 53 may be generally planar and parallel to the lower limit, but substantially smaller in front-to-back width. A vertical distance between the bottom and top limits may be about the same as the horizontal distance between the front and back limits. Volume 53 may be about 1.5-2 $m^3$ (e.g., about 1.8-1.9 $m^3$), or about 3-4% (e.g., about 3.3%) of the volume of enclosure 14**.

As mentioned above, multiple different build volumes may be available for the same system 10 equipped with the same machine 16 and the same enclosure 14. For example, volume 53 may be available when head 52 is oriented generally normal to upper build surface 58 and building layer upon layer upon surface 58. However, it may also be possible for head 52 to discharge material "off axis". That is, an angled print surface may be affixed to surface 58 and/or support 56 that requires head 52 to be oriented at an angle to surface 58 (e.g., and normal to the angled print surface). In these applications, the available build volume may allow for greater or lesser motion from machine 16. It is contemplated that any number of predetermined build volumes may be stored within the memory of controller 74 and automatically and/or manually selectable based on the print surface and/or build-up strategy being employed.

Figure 13:
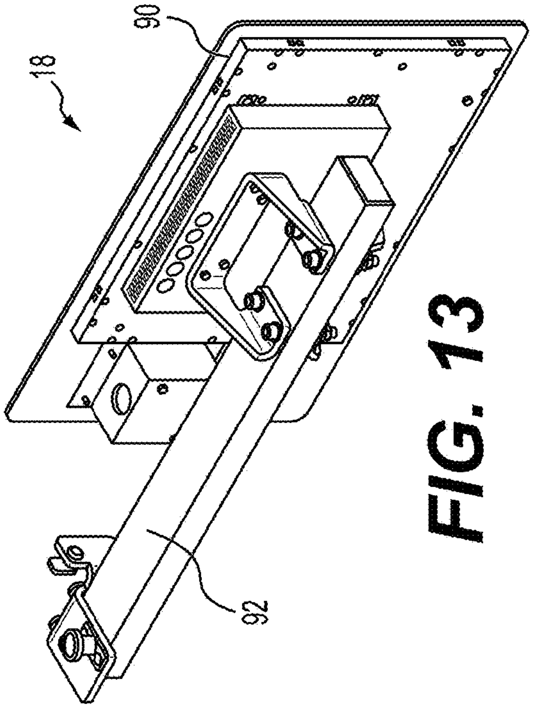

Another example build volume 53 is illustrated in FIG. 13. FIG. 13 will be discussed in more detail below.

Each head 52 may be configured to discharge a material. In one example, the material is a polymer (e.g., a thermoplastic or a thermoset) matrix. The polymer matrix may be reinforced with a continuous and/or discontinuous strand (e.g., a fiber such as glass, carbon, aramid, metal, etc.). Supplies of the polymer matrix and/or strand may be carried onboard printer 44 (e.g., inside of head 52 and/or on platform 50). In some embodiments, the strand is pre-impregnated with the matrix. In other embodiments, the strand is impregnated in situ (e.g., inside of head 52). The matrix-coated strand may be pushed and/or pulled from head 52 as platform 50 moves about within build volume 53.

In some embodiments, the matrix may be a snap-curing material. In these embodiments, one or more cure enhancers (e.g., a UV light, an ultrasonic emitter, a laser, a heater, a catalyst dispenser, a temperature regulator, etc.) 54 (referring to FIGS. 6 and 7) may be controlled to selectively expose portions of structure 12 to energy (e.g., UV light, electromagnetic radiation, vibrations, heat, a chemical catalyst, a pressurized and/or temperature-controlled medium, etc.) during material discharge and the formation of structure 12. The energy may trigger a chemical reaction to occur within the matrix, increase a rate of the chemical reaction, sinter the matrix, harden the matrix, or otherwise cause the matrix to partially or fully cure as it discharges from head 52. The amount of energy produced by cure enhancer 54 may be sufficient to at least partially cure the matrix before structure 12 axially grows more than a predetermined length away from head 52. In one embodiment, structure 12 is cured sufficient to hold its shape before the axial growth length becomes equal to an external diameter of the matrix-coated strand.

In one embodiment, cure enhancer(s) 54 are mounted proximate (e.g., within, on, and/or adjacent) head 52. In another embodiment, cure enhancer(s) 54 are mounted to platform 50 and/or enclosure 14. For example, in place of or in addition to head-mounted cure enhancer(s) 54, one or more of lights 38 may function as cure enhancer(s) 54.

Figure 3:
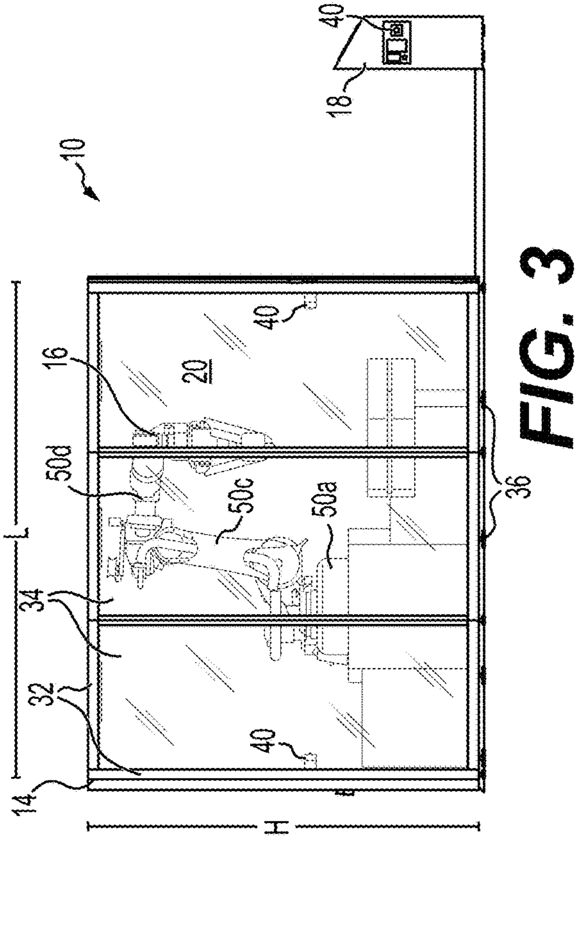
Figure 4:
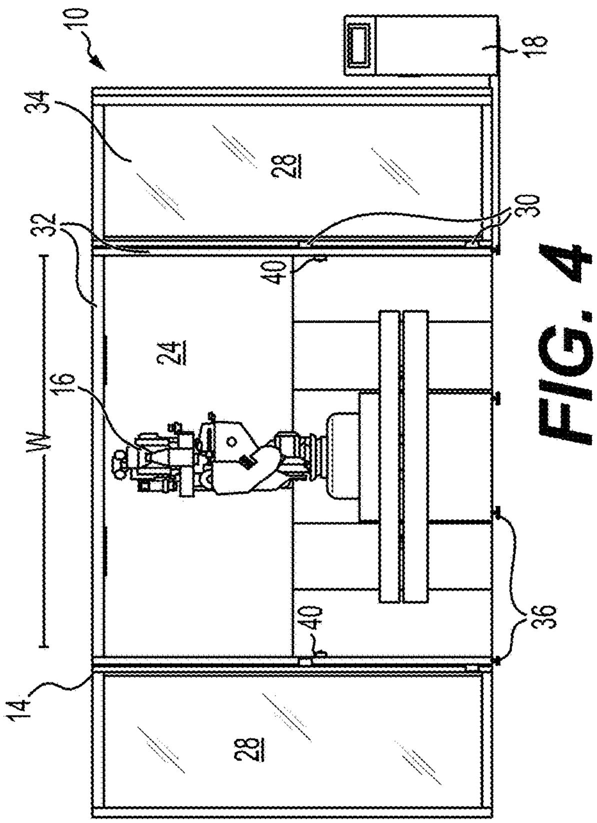

As seen in FIGS. 3 and 4, a size and shape of enclosure 14 may be related to a configuration and size of machine 16. For example, a height H of enclosure 14 may be just greater than an extension distance of link 50*c* away from the floor (or underlying existing surface) when link 50*c* is oriented normal to the floor. In this configuration, link 50*d* may be inhibited from being raised past the horizontal position shown in FIG. 3 at a time when link 50*c* is in the vertical orientation. A length L of enclosure 14 (i.e., the distance from rear wall 24 to doors 28, when doors 28 are closed) may be just greater than an extension distance of link 50*d* and head 52 (e.g., away from a center of base 50*a*) when both link 50*d* and head 52 are oriented horizontally, parallel to the floor, and pointed at doors 28. A width W of enclosure 14 (i.e., the distance between side walls 20, 22) may be just greater than an extension distance of link 50*d* when link 50*d* is oriented horizontally, parallel to the floor, and pointed toward one of side walls 20, 22. The length L may be greater than the height H, which may be greater than the width W. Spacing may be provided at the sides of machine 16 (e.g., between pedestal 48 and side walls 20, 22) to allow an operator to pass by machine 16 and reach rear wall 24.

As shown in FIG. 7, table 46 may be a subassembly of components, including a lower support ("support") 56 and an upper build surface ("surface") 58. Surface 58 may be removably mounted on support 56, while support 56 may in turn be removably mounted on pedestal 48. The removable mounting configuration of surface 58 may allow for intervening fabrication steps at other manufacturing stations to be implemented without having to remove structure 12 from surface 58. For example, surface 58, together with a partially completed structure 12, may be lifted away from support 56 and placed within an oven or a milling center for further processing, before being returned to system 10 for additional fabrication. The removable mounting configuration of support 56 may allow for a different fabrication tool (e.g., a mandrel, rotator, or turntable—shown in FIGS. 12 and 13) to be used in place of a stationary build surface. Each of support 56 and surface 58 may be equipped with lifting hardware (e.g., slots for the forks of a lifting machine, eye bolts, threaded bores, etc.) 60 that facilitate their removal and replacement.

The components of table 46 may be precisely located relative to each other and relative to pedestal 48, such that their removal and replacement can be performed accurately and repeatedly. This should allow for structure 12 to be fabricated to match a predefined virtual model with high precision.

Figure 9:
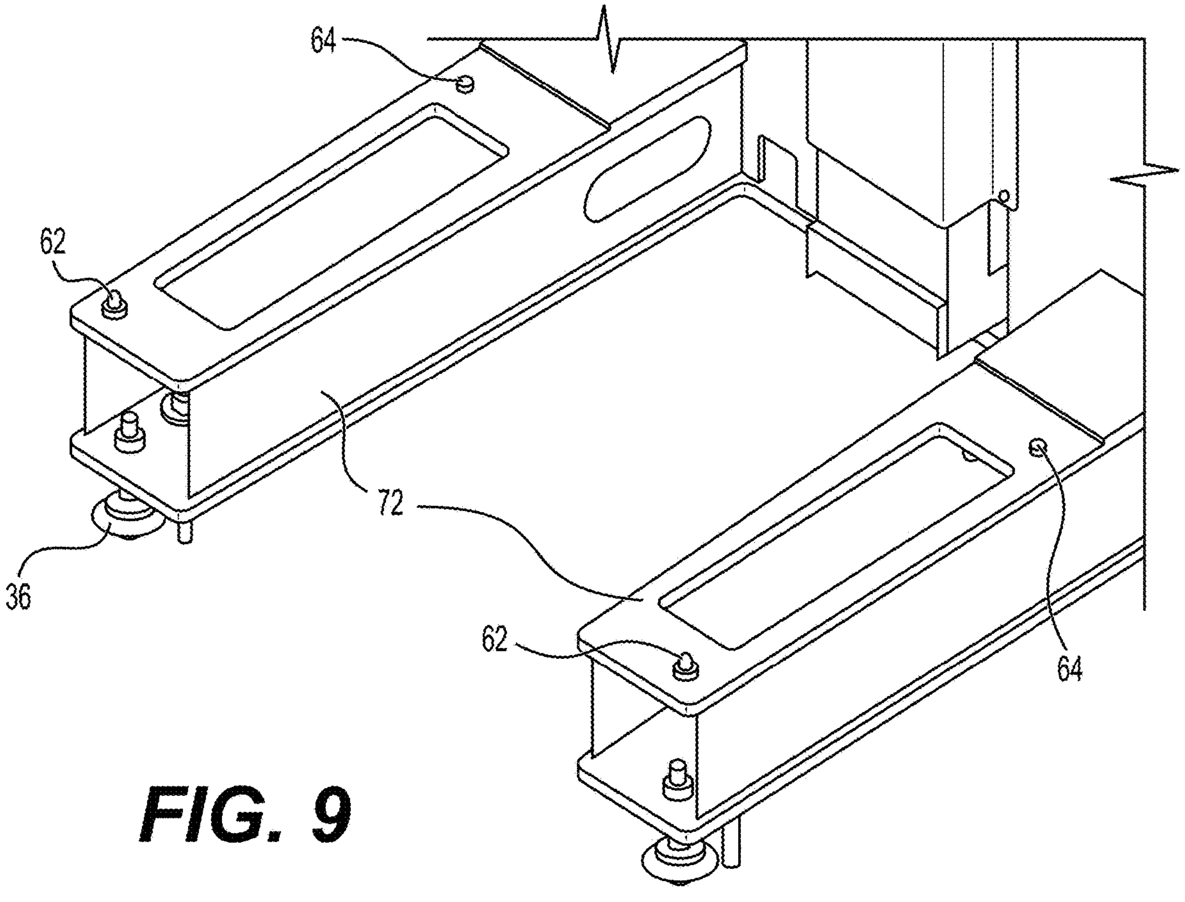
FIGS. 9 and 10 are perspective view illustrations of a pedestal that may be used in conjunction with the manufacturing machine of FIGS. 6 and 7.

For example, as shown in FIG. 9, a plurality of locating features may be disposed between pedestal 48 and support 56 and between support 56 and surface 58. These features may include, among other things, a plurality (e.g., two) locating pins 62 and one or more locating buttons 64. Pin(s) 62 may be tapered and configured to engage corresponding tapered bores (not shown) in a mating component (e.g., bosses adhered to a lower surface of support 56) and thereby provide constraint within a horizontal plane, while buttons

64 may be configured to abut similar buttons (not shown) in the mating component and provide constraint in a vertical plane. Gravity may maintain engagement of the mating components, As shown in FIGS. 6, 7, 9 and 10, pedestal 48 may function primarily as a support for machine 16 and table 46. Pedestal 48 may be elongated in a direction between rear wall 24 and doors 28 and generally consist of three sections. A front section 66 may support table 46; a middle section 68 may support printer 44, and a rear section 70 may support auxiliary equipment. Any number of leveling feet 36 may extend downward from each of these sections toward the existing surface below. In the disclosed embodiment, front section 66 may include any number of (e.g., two) spaced apart arms 72 that extend from middle section 68 under table 46 toward doors 28. Features 62 and 64 discussed above may protrude upward toward support 58 from an upper surface of arms 72.

Middle section 68 may protrude upward away from the existing surface further than either of front or rear sections 66, 70. This distance may allow head 52 to extend down past base line 50*a* and increase a vertical dimension of build volume 53.

Middle section 68, in addition to supporting printer 44, may also house control and power supply components for printer 44. For example, one or more controllers 74 may be housed within middle section 68 and communicatively coupled with printer 44 and/or the auxiliary equipment mounted to rear section 70. Each controller 74 may embody a single processor or multiple processors that are programmed to control an operation of system 10. Controller 74 may include one or more general or special purpose processors or microprocessors. Controller 74 may further include or be associated with a memory for storing data such as, for example, operational limits, performance characteristics, instructions, tool paths, and corresponding parameters of each component of system 10. Various other known circuits may be associated with controller 74, including power supply circuitry, signal-conditioning circuitry, solenoid driver circuitry, communication circuitry, and other appropriate circuitry. Moreover, controller 74 may be capable of communicating with other components of system 10 via wired and/or wireless transmission.

One or more maps may be stored in the memory of or otherwise be accessible by controller 74 and used during fabrication of structure 12. Each of these maps may include a collection of data in the form of lookup tables, graphs, and/or equations. In the disclosed embodiment, the maps may be used by controller 74 to determine movements of head 52 required to produce desired geometry (e.g., size, shape, material composition, performance parameters, and/or contour) of structure 12, and to regulate operation of cure enhancer(s) 54 and/or other related components in coordination with the movements.

In one embodiment, middle section 68 may be pressurized to reduce contamination of controller 74. For example, ambient air from outside of enclosure 14 may be drawn into enclosure 14 via one or more (e.g., two) of the ports 42 mounted in rear wall 24 (see FIGS. 5 and 10). This air may then be ducted into middle section 68 at a pressure elevated to sufficiently inhibit ingress of dust or debris through other openings of middle section 68. In addition to helping reduce contamination of controller 74 and other associated equipment, the air may also help to cool the equipment. It is contemplated that the air used to pressurize middle section 68 could alternatively be drawn from only inside of enclosure 14 (e.g., via a port/impeller mounted to a wall of middle section 68), if desired.

Rear section 70 may include additional air handling equipment, in some embodiments. For example, the air handling equipment mounted on rear section 70 may include at least a fan (not shown) and a filter 76 disposed at least partially inside of a housing 78. The fan may be configured to generate air flow from a location over table 46, through an inlet duct 80, under middle section 68, and up through filter 76. Filter 76 may be configured to remove debris and/or fumes from the air before exhausting the air back into enclosure 14.

It should be noted that enclosure 14, in general, could be environmentally controlled, if desired. For example, enclosure 14 could be hermetically sealed to the existing surface there below or otherwise include a floor (not shown) that is sealed to side walls 20, 22, rear wall 24, and doors 28. In this configuration, ports 42, filter 76, housing 78 and/or duct 80 and the associated impellers and/or fans could be used to pressurize and/or filter all of enclosure 14. It is contemplated that temperature and/or humidity could be similarly controlled.

Figure 10:
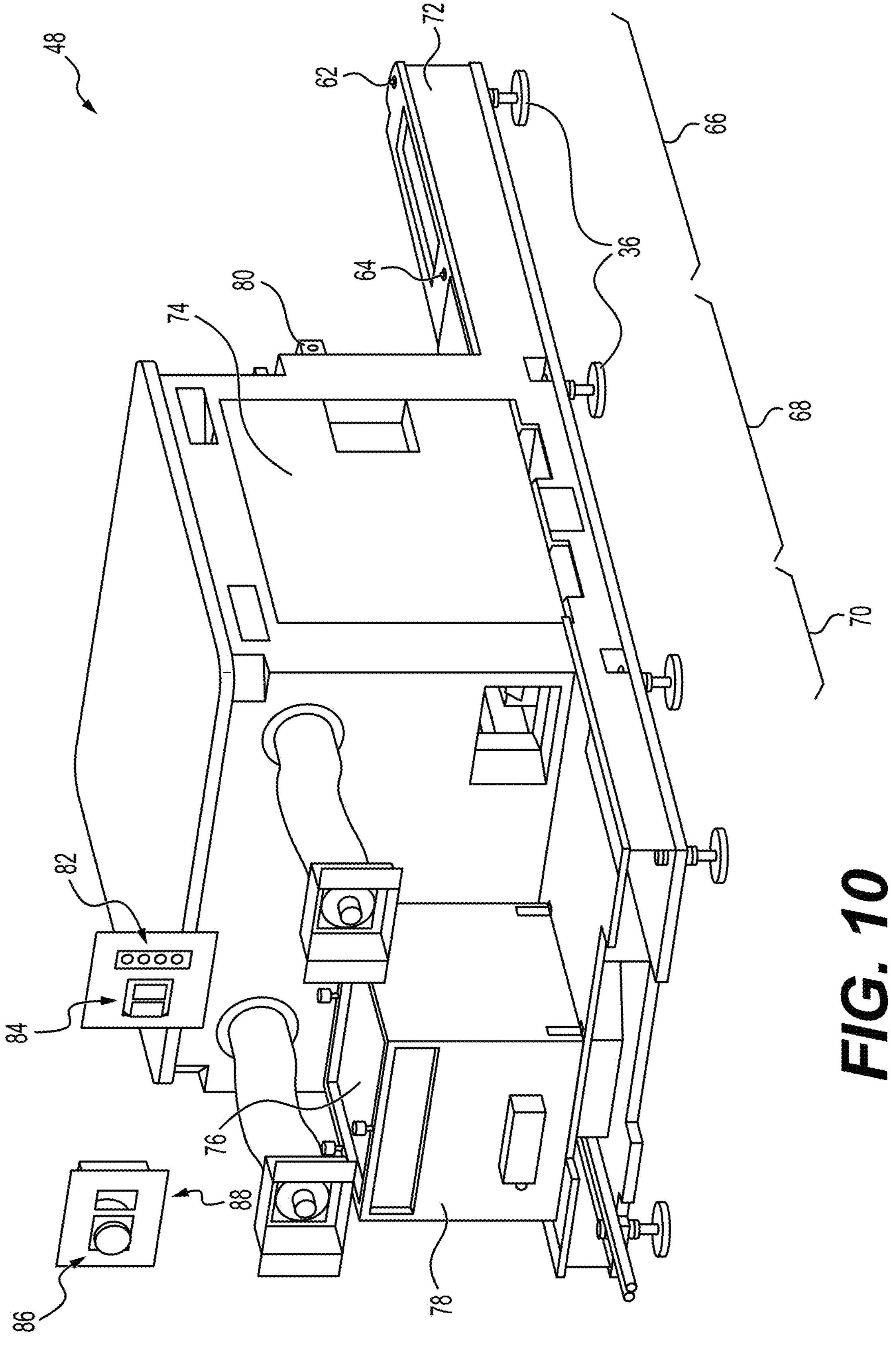

As further illustrated in FIG. 10, beyond ventilation ports, ports 42 may additionally include one or more operational ports for receiving pressurized air (e.g., ports 82) and/or electrical power (e.g., ports 84) used to operate portions of machine 16. A main power switch 86 and/or breaker 88 may also be mounted to rear wall 24 and used to activate or deactivate system 10. It is contemplated that switch 86 and/or breaker 88 could alternatively be mounted inside of enclosure 14 (e.g., to middle section 68), if desired.

Figure 12:
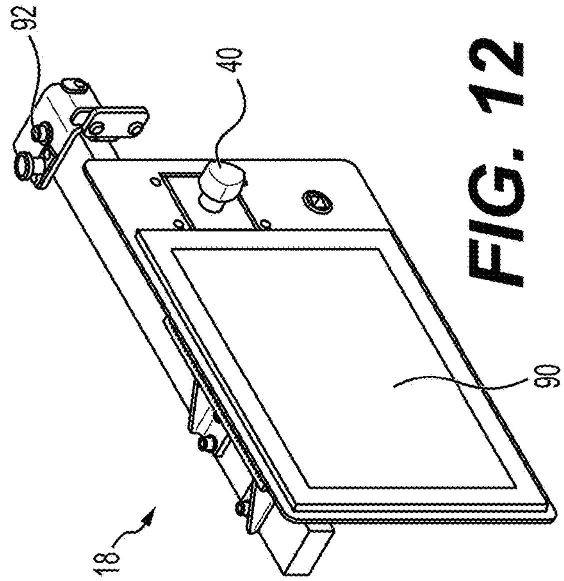
FIGS. 12 and 13 are perspective view illustrations of an HMI that may be used in conjunction with the manufacturing system of FIGS. 1 and 2.
Figure 11:
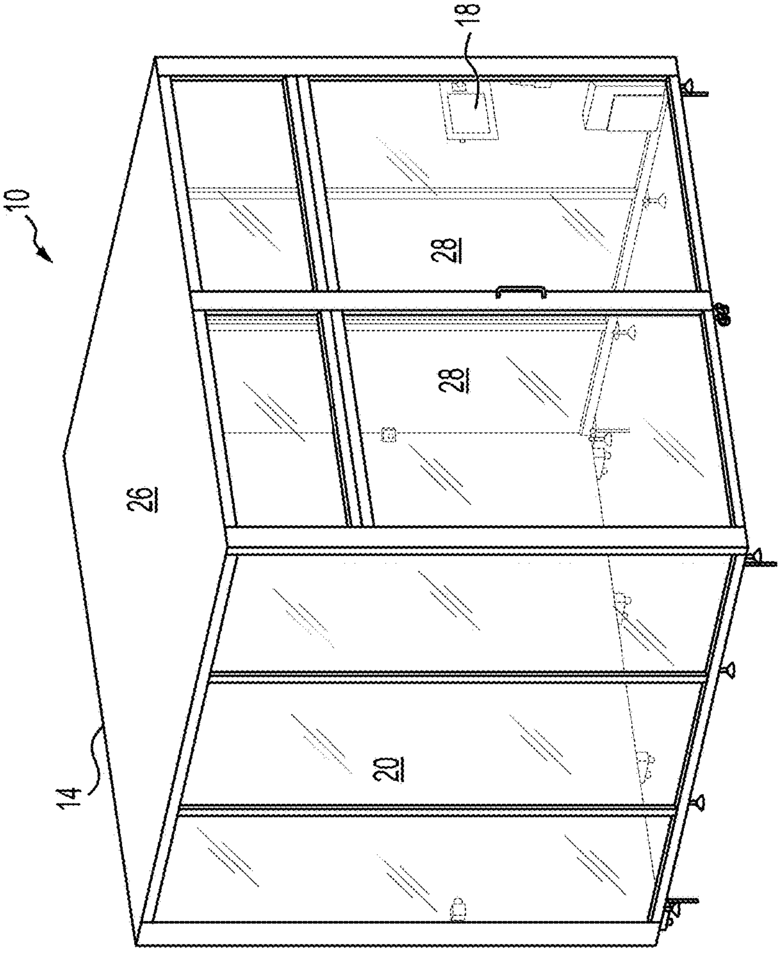
FIG. 11 is a perspective view illustration of an enclosure that may form a portion of the manufacturing system of FIGS. 1 and 2.

FIGS. 11-13 illustrate an alternative embodiment of system 10, wherein HMI 18 is located differently. That is, instead of HMI 18 being located remotely from and outside of enclosure 14, HMI 18 of FIGS. 11-13 may be integrated with enclosure 14. In this new configuration, HMI 18 may still be accessible from outside of enclosure 14, yet also accessible from inside of enclosure 14. For example, enclosure 14 may be mounted at a front of enclosure 14, adjacent (e.g., just inside of) door (e.g., the right-side door shown in FIG. 11) 28. An opening may be formed in this door 28, allowing access to HMI 18 from outside of enclosure 14, even when door 28 is closed.

HMI 18 of FIGS. 11-13 may be configured to pivot away from door 28. This may be desirable, for example, when operating machine 16 from inside of enclosure 14 or simply to provide unobstructed clearance when door 28 is open. HMI 18 may include, among other things, one or more input/output devices (e.g., a touch screen, a microphone, a speaker, a keyboard, a button, a switch, a light, etc.) 90 and e-stop 40 that are together pivotally connected to skeletal structure 32 via a swing arm 92. HMI 18 may be able to swing from a first position generally flat against side wall 22 through about 90° to a second position generally flat against door 28.

FIGS. 12 and 13 illustrate the stationary table 46 being replaced by a moveable tool 94 for use with printer 44 inside of enclosure 14. In this example, tool 94 is a horizontally mounted rotator (a.k.a., rotary index table) having at least one of a headstock 96 and a tail stock 98 (e.g., example of FIG. 13 includes both). Headstock 96 may be generally aligned with tailstock 98 along a rotational axis 100. At least one of headstock 96 and tailstock 98 may be driven (e.g., via a motor 101) to rotate about axis 100. Headstock 96 and tailstock 98 may be configured to support structure 12 therebetween, such that structure 12 may be rotated about axis 100 during discharge of material by printer 44. In some embodiments, an internal form (e.g., a mandrel or other support—not shown) may be affixed between head stock 96 and tailstock 98 to support the discharging material. The internal form may form a permanent part of structure 12 or be removed after fabrication of structure 12, as desired.

Headstock 96 and tailstock 98 may be rotationally mounted within a frame 102 (e.g., between spaced-apart uprights 103) via bearings 104. Frame 102 may maintain a desired spatial relationship between headstock 96 and tailstock 98, as well as between tool 94 and printer 44. Frame 102 may include the same features as table support 56 (referring to FIGS. 7 and 9) to engage features 62 and 64 of arms 72 of pedestal 48. As described above, this engagement may accurately position tool 94 relative to printer 44. Controller 74 may communicate with motor 101 to coordinate operations of tool 94 with operations of printer 44.

Figure 14:
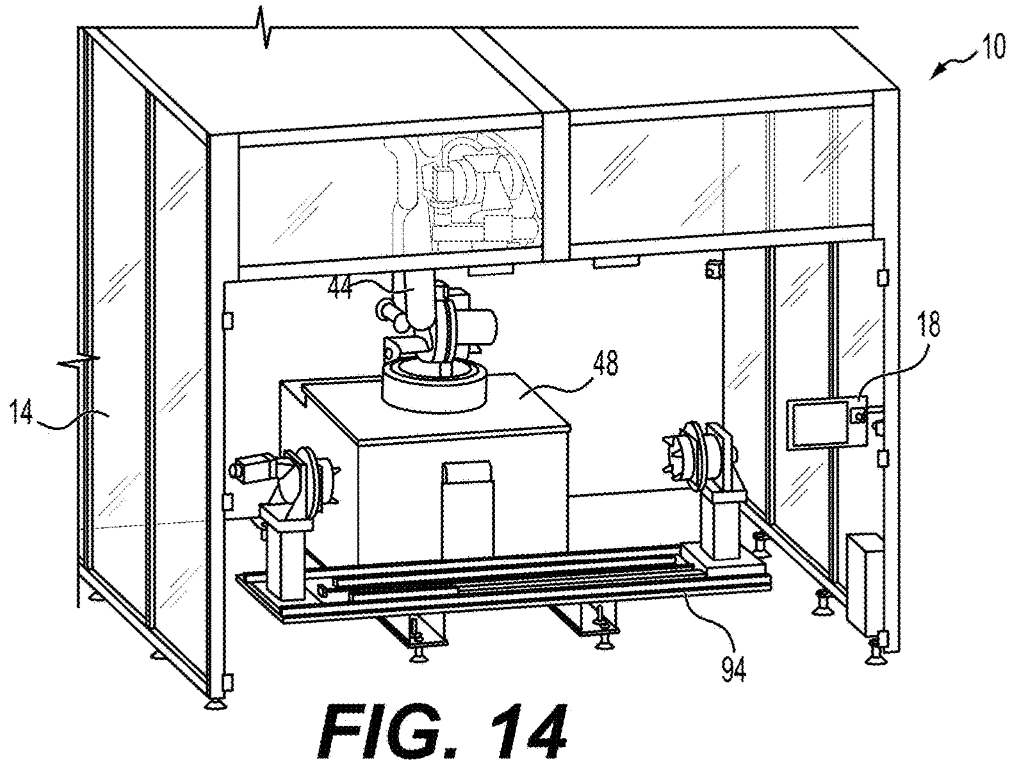
FIGS. 14 and 15 are perspective view illustrations of the system of FIGS. 1 and 2 and the pedestal of FIGS. 9 and 10 with an exemplary tool.
Figure 15:
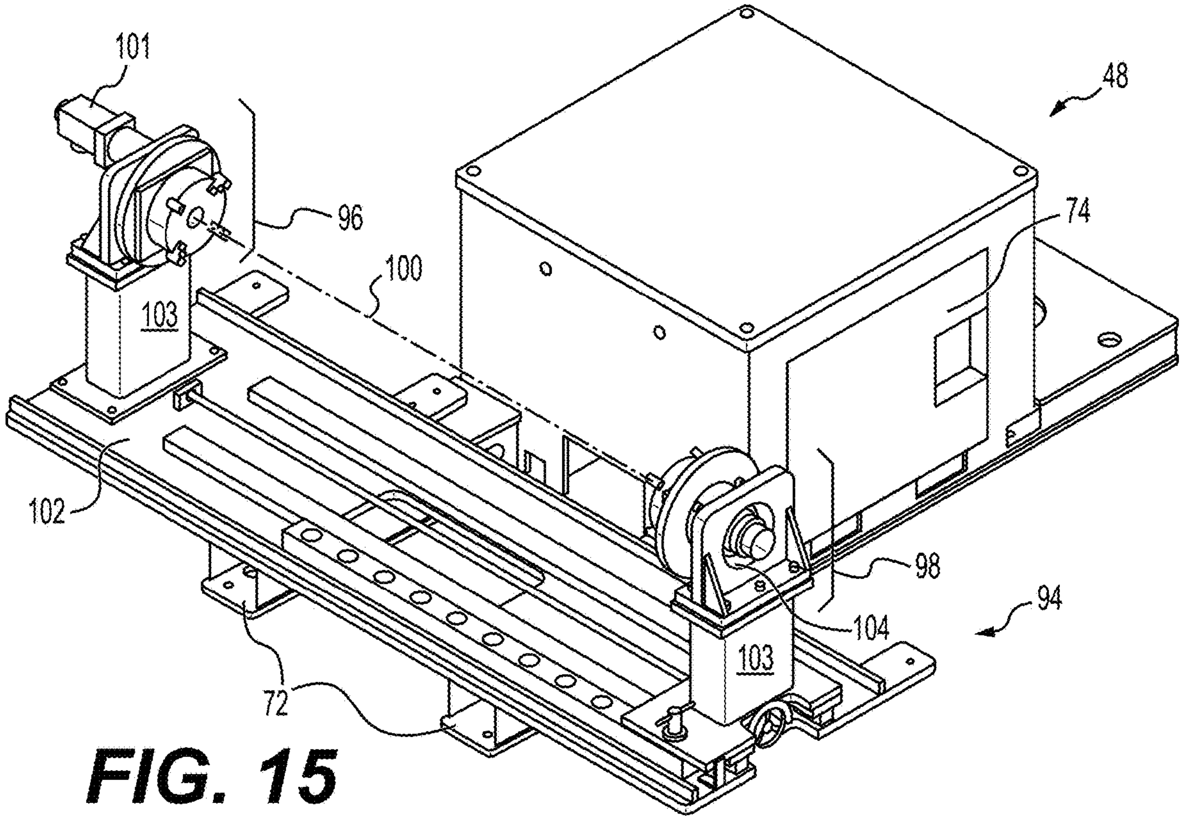
Figure 16:
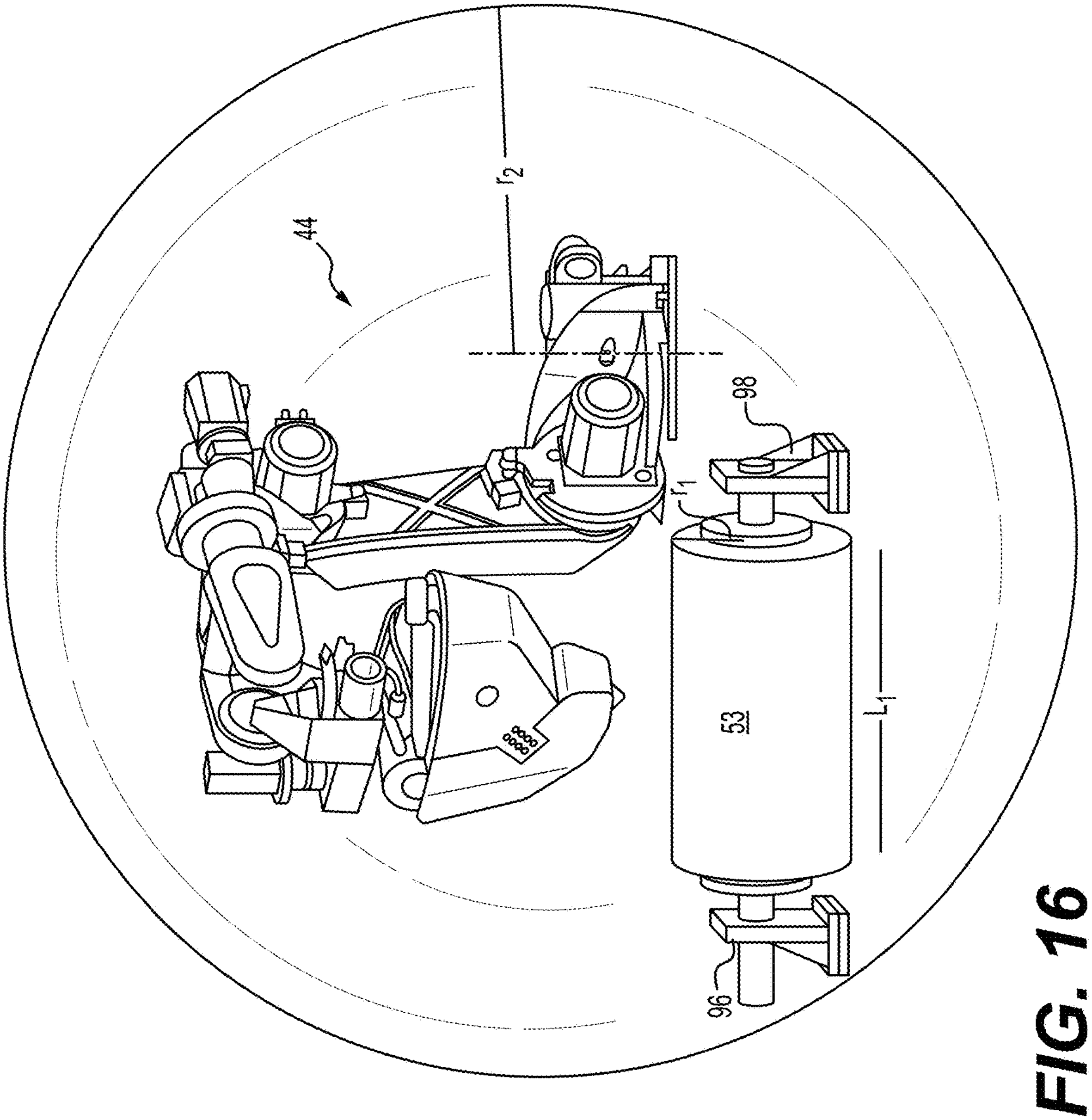
FIG. 16 is a diagrammatic illustration of an exemplary build volume that may be used by the manufacturing machine of FIGS. 6 and 7.

As mentioned above, system 10 may include multiple different print volumes 53. The different volumes 53 may be related to the particular tool supported by arms 72 and the corresponding types/sizes of structures 12 that can be fabricated using the tools. In the embodiment of FIG. 14, print volume 53 associated with tool 94 may be generally cylindrical and extend axially between headstock 96 and tailstock 98 (e.g., centered about axis 100—referring to FIG. 13). As shown in FIG. 14, volume 53 may fit inside of a sphere of motion associated with printer 44. The sphere of motion may represent a volume throughout which head 52 of printer 44 can move. This sphere may have a radius ($r_1$) of about 1.5-2 $m^3$. In this same embodiment, the cylinder of volume 53 may have length of about 2-2.25 m (e.g., about 2.1 m) and a radius of about 0.5-0.7 m (e.g., about 0.6 m). The print motion volume may be about 5-15 times the size of volume 53.

INDUSTRIAL APPLICABILITY

The disclosed systems may be used to additively manufacture parts or structures having a variety of cross-sectional shapes, sizes, and functions. The disclosed systems may allow for multiple processes to be utilized in various orders, without sacrificing accuracy and repeatability. This may help to improve quality and reduce waste. The disclosed systems may also help to maintain obstruction-free operational zones that improve workplace safety.

During operation of system 10, a particular deposition head 52 (e.g., a particular size of head, type of head, head having a particular preloaded material, etc.) may be mounted to an end of platform 50. A particular build surface 58 (e.g., an arcuate surface, a rectangular surface, an off-axis surface, a smaller subsurface, etc.) may be positioned on support 56. Doors 28 may be closed, an environment within enclosure 14 may be prescribed, and operation of system 10 may be activated from outside of enclosure 14 via HMI 18. This activation may cause doors 28 to lock and machine 16 to begin discharging material and fabricating structure 12 within build volume 53.

At any point in time during the fabrication of structure 12, operation of machine 16 may be paused and/or terminated. For example, the additive process discussed above may be interrupted by another process (e.g., a subtractive process, a heat treatment process, a cleaning process, etc.). This interruption may require doors 28 to be opened and build surface 58 to be lifted away from support 56. Build surface 58, along with structure 12 may then be transported to another processing center for implementation of the intermediate process. During this time, a different build surface 58 could be placed onto support 56, if desired, for use in temporarily fabricating a different structure. After completion of the intermediate process, the original build surface 58 may be returned to system 10 and additional fabrication may commence, without loss in positional accuracy.

Alternatively or additionally, table 46 may be completely removed from arms 72 and set aside, allowing another tool to be used in its place. For example, rotator tool 94 may be placed on top of arms 72 using features 62, 64 to ensure accurate placement. Controller 74 may then coordinate operation of motor 101 with that of platform 50 and head 52 to fabricate a structure 12 that benefits from rotational motion.

It will be apparent to those skilled in the art that various modifications and variations can be made to the disclosed manufacturing systems. Other embodiments will be apparent to those skilled in the art from consideration of the specification and practice of the disclosed manufacturing systems. It is intended that the specification and examples be considered as exemplary only, with other examples also being within the scope of the disclosure.

What is claimed is:

1. An additive manufacturing system, comprising:
a pedestal;
a robotic arm mounted to the pedestal;
a print head coupled to the robotic arm;
an enclosure at least partially surrounding the robotic arm and the print head and providing an internal working space for an operator of the additive manufacturing system, wherein the enclosure includes:
a ceiling;
first side wall;
a second side wall opposite the first side wall;
a rear wall connected between the first and second side walls; and
at least one door opposite the rear wall;
a print platform; and
an HMI located inside of the enclosure, the HMI being located adjacent to the at least one door and accessible from outside of the enclosure,
wherein the HMI is configured to pivot between a deployed position accessible from outside of the enclosure and a stowed position located against one of the first side wall or the second side wall that is not accessible from outside of the enclosure.

2. The additive manufacturing system of claim 1, wherein the at least one door includes an opening for accessing the HMI externally while the door is closed.

3. The additive manufacturing system of claim 1, wherein the HMI is configured to receive user inputs for activating operation of the additive manufacturing system.

4. An additive manufacturing system, comprising:
a pedestal;
a robotic arm mounted to the pedestal;
a print head coupled to the robotic arm;
an enclosure at least partially surrounding the robotic arm and the print head and providing internal working space for an operator of the additive manufacturing system;
a print surface, and
a build volume located inside of the enclosure, the build volume defined by a plurality of boundary limits including at least a front limit and a back limit, wherein the front limit is curved,
wherein the plurality of boundary limits further includes a first planar side limit and a second planar side limit corresponding to lateral ends of the print surface.

5. The additive manufacturing system of claim 4, further including a controller mounted inside the pedestal and configured to regulate operation of the robotic arm and the print head.

6. The additive manufacturing system of claim 4, wherein the enclosure includes:

a first side wall;

a second side wall opposite the first side wall;

a rear wall connected between the first and second side walls; and at least one door opposite the rear wall; and a ceiling, and the enclosure completely encloses the additive manufacturing system.

7. The additive manufacturing system of claim 6, wherein at least one of the first side wall, the second side wall, and the at least one door is at least partially transparent, and wherein the at least one of the first side wall, the second side wall, and the at least one door is configured to filter energy from the environment from entering the enclosure and causing material discharging from the print head to prematurely cure.

8. The additive manufacturing system of claim 6, further including at least one e-stop located inside the enclosure and being manually operable by an operator inside of the enclosure.

9. The additive manufacturing system of claim 6, further including an interlock device associated with the at least one door and configured to disable the additive manufacturing system when the at least one door is opened.

10. The additive manufacturing system of claim 4, wherein the build volume is about 3-4% of a volume of the enclosure.

11. The additive manufacturing system of claim 4, further including:

a support table removably disposed between the pedestal and the print surface;

a first plurality of locating features disposed between the support table and the pedestal and configured to precisely locate the support table relative to the pedestal in a removeable manner; and a second plurality of locating features disposed between the support table and the print surface and configured to precisely locate the print surface relative to the support table in a removeable manner, wherein the second plurality of locating features are a different type than the first plurality of locating features.

12. The additive manufacturing system of claim 4, further including a horizontal rotator tool removably connected to the pedestal, wherein the print surface is located on a form held by the horizontal rotator tool and rotatable during discharging of material by the print head onto the print surface.

13. The additive manufacturing system of claim 4, wherein the front limit of the build volume is curved from top to bottom and side to side.

* * * * *